(12) United States Patent
Rosenblatt

(10) Patent No.: US 7,270,263 B2
(45) Date of Patent: Sep. 18, 2007

(54) SYSTEMS AND METHODS FOR AUTOMATICALLY DISTRIBUTING GIFTS TO RECIPIENTS ON BEHALF OF CUSTOMERS

(75) Inventor: Charles A. Rosenblatt, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 133 days.

(21) Appl. No.: 10/796,188

(22) Filed: Mar. 10, 2004

(65) Prior Publication Data

US 2005/0199712 A1 Sep. 15, 2005

(51) Int. Cl.
G06Q 40/00 (2006.01)
(52) U.S. Cl. .................. 235/379; 235/380; 235/382
(58) Field of Classification Search ............... 235/381, 235/380, 383, 379, 382; 705/39, 40, 41
See application file for complete search history.

(56) References Cited

U.S. PATENT DOCUMENTS

| | | | | |
|---|---|---|---|---|
| 5,984,180 A * | 11/1999 | Albrecht | ................ | 235/380 |
| 6,175,823 B1 | 1/2001 | Van Dusen | | |
| 6,370,514 B1 * | 4/2002 | Messner | ................ | 705/14 |
| 6,454,165 B1 * | 9/2002 | Dawson | ................ | 235/381 |
| 6,473,500 B1 * | 10/2002 | Risafi et al. | ................ | 379/144.01 |
| 6,609,106 B1 | 8/2003 | Robertson | | |
| 6,611,814 B1 | 8/2003 | Lee et al. | | |
| 6,615,189 B1 * | 9/2003 | Phillips et al. | ................ | 705/41 |
| 6,633,849 B1 * | 10/2003 | Dodd | ................ | 705/1 |
| 6,805,289 B2 * | 10/2004 | Noriega et al. | ................ | 235/380 |
| 6,837,426 B2 * | 1/2005 | Tidball et al. | ................ | 235/380 |
| 6,892,187 B2 * | 5/2005 | Phillips et al. | ................ | 705/41 |
| 2002/0032605 A1 | 3/2002 | Lee | | |
| 2002/0091631 A1 | 7/2002 | Usui | | |
| 2002/0143664 A1 | 10/2002 | Webb | | |
| 2003/0171997 A1 | 9/2003 | Eaton | | |

\* cited by examiner

*Primary Examiner*—Ahshik Kim
(74) *Attorney, Agent, or Firm*—Finnegan, Henderson, Farabow, Garrett & Dunner, L.L.P.

(57) ABSTRACT

Systems and methods for providing gifts are described. In one exemplary embodiment, the systems and methods may include receiving financial card distribution information from a consumer, wherein the financial card distribution information identifies at least one recipient for a financial card and a predetermined delivery time for providing the financial card to the recipient, storing the financial card distribution information in a database, such that the stored financial card distribution information is associated with the consumer, and preparing a communication to the recipient to provide the financial card to the recipient at the predetermined delivery time.

33 Claims, 3 Drawing Sheets

SYSTEMS AND METHODS FOR AUTOMATICALLY DISTRIBUTING GIFTS TO RECIPIENTS ON BEHALF OF CUSTOMERS

BACKGROUND

I. Technical Field

The present invention generally relates to methods and systems for distributing gifts and, more particularly, for distributing gifts on behalf of a customer.

II. Background and Material Information

As each generation passes, the lives of each become more frenetic. Although technological advances have made people's days fuller and richer, they have also made them busier. In this age of instantaneous communication and near-instantaneous transportation, the sheer number of individuals and events in everyone's life has grown greatly. Many people thus have difficulty tracking important events associated with various family members, friends, colleagues, associates, and other acquaintances. The numerous events people may need to track for each of these individuals may include birthdays, anniversaries, and other holidays. Moreover, people often have trouble selecting gifts for many individuals.

Accordingly, there is a need for a system and method for providing an efficient way for consumers to track certain occasions and to select and send gifts to individuals on behalf of the consumers for those occasions.

SUMMARY OF THE INVENTION

Consistent with embodiments of the present invention, systems and methods disclosed may facilitate the purchase and delivery of a financial card.

One exemplary aspect of the invention relates to a method, performed by a processor, for providing a financial card to at least one recipient for a consumer. The method may comprise receiving financial card distribution information from a consumer, wherein the financial card distribution information identifies at least one recipient for a financial card and a predetermined delivery time for providing the financial card to the recipient, storing the financial card distribution information in a database, such that the stored financial card distribution information is associated with the consumer, and preparing a communication to the recipient to provide the financial card to the recipient at the predetermined delivery time.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
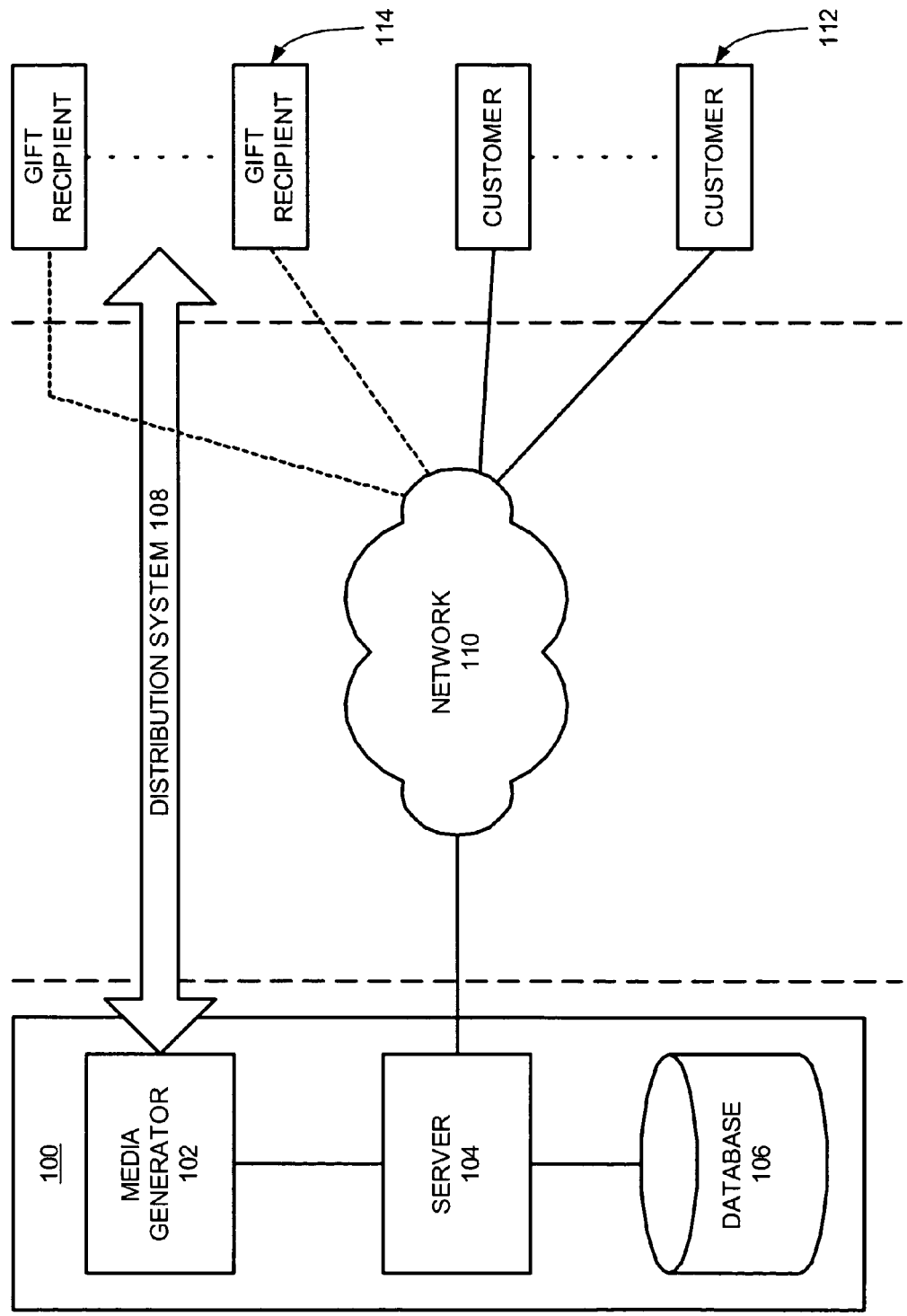
FIG. 1 illustrates an exemplary gift concierge system consistent with the invention.

The following detailed description refers to the accompanying drawings. Wherever possible, the same reference numbers are used in the drawings and the following description when referring to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Consistent with the present invention, gift distribution systems and methods are provided for distributing financial gift cards on behalf of a customer. As described herein, the term "gift card" refers broadly to any financial card provided to a recipient on behalf of a customer. The gift card may be, for example, a pre-stored value card, a redeemable credit card, a pre-paid charge card, a pre-paid credit card, or any other type of financial card or account having a pre-stored value.

As described below, the gift distribution system may receive gift distribution information from customers. The gift distribution information may identify particular gift recipients, a particular gift card to distribute to the recipient, and a distribution time. Thus by providing this information to the gift distribution system, the customer may schedule delivery of a gift card to a recipient to automatically occur at specific times (e.g., birthdays, anniversaries, Christmas, Valentine's day, weddings, baby showers, etc.). Once the system receives the gift distribution information, the system may manage the distribution of the financial gift cards to occur at the identified distribution times. The system also includes a media generator to generate, for example, customized media to accompany the gift card to the recipient (such as a greeting card). The gift distribution system may then charge or bill the customer via credit card or any other form of payment at either the time the customer schedules the distribution of the gift card, at the time the gift card is sent, or at the time a recipient receives the gift card.

Further, in exemplary embodiments, the gift distribution system may monitor the distributed gift card for determining whether to convert the gift card to a financial credit card account. For example, the gift card may be converted to a credit card at a predetermined time after the recipient has depleted the gift card's pre-stored value or after the gift card is delivered to the recipient. Upon converting the gift card to a credit card, the system may then allow the recipient to continue using the gift card as a credit card and update the recipient's status as a credit card account holder associated with the converted card.

An embodiment consistent with the invention may comprise a system for providing a financial card to at least one recipient for a consumer. The system may comprise: a component for receiving financial card information from a consumer that identifies at least one recipient for a financial card and a predetermined delivery time for providing the financial card to the recipient; a component for storing the financial card information in a database, such that the stored financial card information is associated with the consumer; and a component for preparing a communication to the recipient to provide the financial card to the recipient at the predetermined delivery time.

Consistent with an embodiment of the present invention, the aforementioned components may be implemented in a gift distribution system, such as an exemplary gift distribution system 100 of FIG. 1. Any suitable combination of hardware, software, and/or firmware may be used to implement the above components. The aforementioned system 100 is exemplary and other systems may comprise the aforementioned gift distribution system, consistent with embodiments of the present invention.

By way of a non-limiting example, FIG. 1 illustrates an exemplary gift distribution system 100 consistent with the invention. As shown in FIG. 1, the exemplary system environment may include a number of components, including a media generator 102, a gift distribution server 104, and a gift information database 106. These components may be included within gift distribution system 100 and may be owned or operated by an entity that distributes and/or manages gift cards and/or financial products.

As also shown in FIG. 1, gift distribution system 100 may communicate via a distribution system 108 and/or a network 110 with customers 112 and gift recipients 114. For instance, server 104 may receive gift distribution information from customers 112 over network 110. However, while not shown in FIG. 1, customers 112 who do not have, or elect not to use network access, may access server 104 via other communication channels (e.g., via distribution system 108). Analogously, gift recipients 114 may receive gift cards from system 100 via distribution system 108 or network 110.

As described above, gift distribution system 100 may distribute any financial gift card, such as a pre-stored value card, a redeemable credit card, a pre-paid charge card, a pre-paid credit card, or any other type of financial card or account having a pre-stored value. For example, the gift card may be a pre-stored value card having a pre-stored monetary amount (e.g., $10, $20, etc.) or redeemable credit amount (e.g., 10 value points to be redeemed with particular merchants). The gift card could also be associated with a certain business or group of businesses (e.g., Macy's, Hecht's, Best Buy, etc.) at which the recipient 114 may use or redeem the gift card. Alternatively, the gift card may be a generic card that recipient 114 may use at any or almost any business.

In addition, system 100 may be associated with a financial institution offering other types of financial account products, such as credit cards. In such cases, the delivered gift cards may be specially branded with the financial institution's name. Recipients 114 who receive the specially branded gift cards are then made more aware of the financial institution and its products, thereby increasing the financial institution's market presence.

Media generator 102 may generate communication media for distribution to customers 112 and gift recipients 114 associated with the distributed gift cards. Notifications generated by generator 102 may include notices to customers 112 that a gift card has been delivered, notices to gift recipients 114 about a distributed gift card, or notices to recipients 114 about changes in status of a distributed gift card. Consistent with an embodiment of the invention, media generator 102, may be an internal system or generator of the entity that is operating system 100. Alternatively, some or all of the functions performed by media generator 102 may be outsourced to a third party. Media generator 102 may include, for example, a financial gift card printer, a gift card stamping machine, a gift card production facility, a letter printing and mailing machine, and/or any other device or components for generating gift cards or related notifications to customers 112 and/or recipients 114.

Gift distribution server 104 may incorporate functionality for performing methods related to embodiments of the invention. As further disclosed herein, server 104 may perform various functions, including: providing functionality for customers 112 to select gift cards and schedule distribution of those cards to certain recipients 114; receiving gift distribution information from customers 112; managing distribution of gift cards; obtaining payment for distributed gift cards; monitoring distributed gift cards for possible changes in status; and/or other functions.

Further, gift distribution server 104 may be implemented to perform the functions described in detail below with respect to FIGS. 2 and 3. In this respect, server 104 may include software (e.g., a website, software application, or any other compatible application) for performing any of its functions. The software may be implemented in Java, HTML, Basic, Visual Basic, C, C++, Visual C, FORTRAN, Pascal, COBOL, LISP, assembly language, machine code, firmware, or any other programming or computer-readable language. The software may be stored, at least partially, on server 104. The software may also be stored, at least partially, on a client station (e.g., a computer terminal accessible by customer 112 and/or recipient 114) and may be partially downloaded and/or installed on the client station prior to, during, or after accessing gift distribution system 100. The client station may be located at a kiosk, a point-of-sale, a household, a department store, an office, and/or any other location compatible with features and principles of the present invention.

Database 106 may store any information or logic needed for implementing embodiments of the invention. For example, database 106 may store information on gift cards available for purchase by customer 112 and for delivery to recipients 114. Database 106 may also contain customer information related to customers 112 who have selected gift cards for delivery to recipients 114, as well as pertinent information and/or logic for managing the distribution of those gift cards. For instance, database 106 may store data on gift cards selected by customers 112 for distribution to recipients 114, status information on the delivery of a gift card, status information on the account of the distributed gift card, or payment information for the gift card. Database 106 may include a hard drive, a tape drive, an optical drive, a RAID disk array, an SQL system, and/or any other device or system that may persistently store information.

Media generator 102, server 104, and database 106 may be implemented through any suitable combination of hardware, software and/or firmware. Such components may be directly or indirectly connected with one another, or provided as part of an integrated system. By way of non-limiting examples, the disclosed components may be implemented using one or more general-purpose computer(s), mainframe(s), or computing plafform(s) selectively activated or reconfigured by program code to provide the necessary functionality. Further, one or more of these components may be outsourced to or operated by a third party that provides, for example, hosted databases, applications and/or other services.

Distribution system 108 may distribute gift media generated by media generator 102 to recipients 114. Distribution system 108 may also receive gift purchase and scheduled delivery orders from customers 112. Distribution system 108 may include a mail carrier service (e.g., U.S. Postal Service, etc.), a courier service (e.g., FedEx, UPS, DHL, etc.), a distributor network, and/or any other mechanism for delivering a financial card.

To facilitate communication with customers 112 and recipients 114, gift distribution server 104 may be adapted to communicate via network 110. Network 110 may comprise a network or combination of networks to permit communication between server 104 and customers 112 or gift recipients 114. In addition, server 104 may host or be connected to a separate server that hosts a Web site or set of Web pages that can be accessed by customers 112 or gift recipients 114. In another embodiment, server 104 may comprise or be connected to an e-mail server for receiving or sending electronic communications from or to customers 112 or gift recipients 114 via network 110. Network 110 may include a local area network, a wide area network, an intranet, an extranet, the Internet, a telephone network, a wired network, a wireless network, and/or any other medium for communicating between locations.

Figure 2:
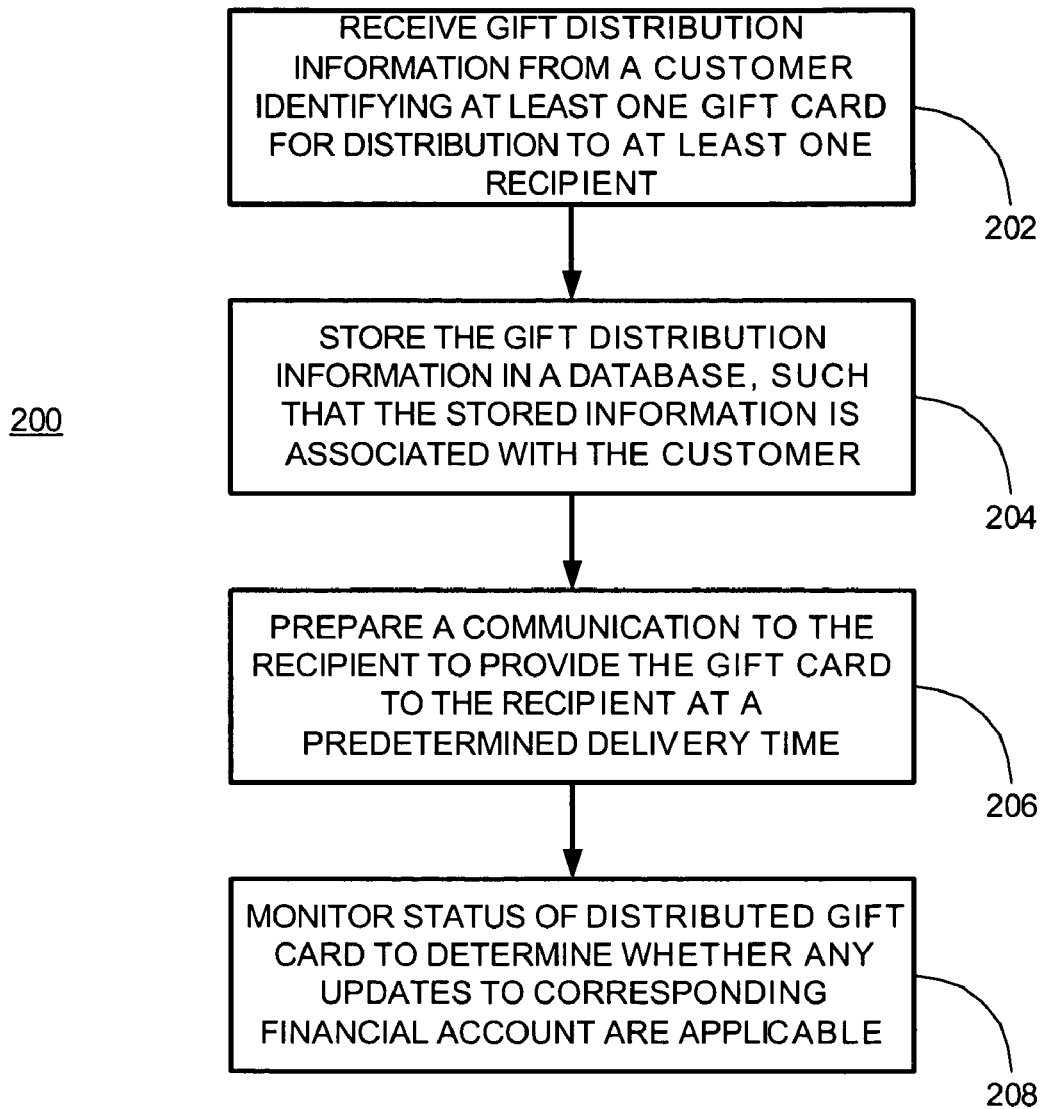
FIG. 2 illustrates an exemplary method for providing a financial card consistent with the invention.

FIG. 2 illustrates an exemplary method consistent with the present invention for distributing financial gift card products. As shown in FIG. 2, server 104 may receive gift distribution information from a customer 112 (stage 202). Server 104 may receive the gift distribution information from one or more customers 112 via, for example, network 110 through respective client stations (not shown) used by such customers.

As discussed above, the gift distribution information may identify at least one recipient 114 for receiving a gift card. The information may include an identification of the type of gift card to provide to recipient 114, as well as a predetermined delivery time for providing the gift card to recipient 114. The predetermined delivery time may include when system 100 should distribute the gift card, and/or when recipient 114 should receive the gift card. As described below with respect to FIG. 3, a customer 112 may schedule gift card deliveries for numerous recipients 114 over any certain time. As an exemplary illustration, customer 112 may access system 100 at the beginning of each year to schedule delivery of gift cards to recipients 114, such that they occur automatically over the course of the year at predetermined delivery dates (e.g., birthdays, holidays, etc.).

Further, the gift distribution information may include a recipient address, a gift card preference, and/or other relevant information for distribution of gift cards. The address may be a postal mailing address, e-mail address, or any other information identifying a place or location to deliver the financial gift card. The gift preference data may further include an identification of the particular type of gift card for system 100 to distribute, such as the pre-stored value to be associated with the gift card, a gift card type, or other special features (e.g., whether system 100 may convert the gift card to a pre-approved credit card).

Upon receiving the gift distribution information, server 104 may store the information in database 106 (stage 204). Further, for each customer, database 106 may contain a record associating relevant gift card information with the respective customer. The record may, for instance, reflect the gift distribution information received in stage 202, as well as various status information generated by system 100 with respect to distribution of the gift card or recipient 114's use of the gift card. Server 104 may allow customer 112 to access the stored gift distribution information for viewing or modification over network 110 or via some other interface.

Media generator 102 may then generate a communication to each identified recipient 114 to distribute the gift card at the predetermined delivery time (stage 206). The generated communication may include the financial card and/or a greeting card or a personal message to the recipient. Any customized greetings or messages included in the communication generated by generator 102 may be based on information received from the customer 112 as part of stage 202. Once the communication is generated, media generator 102 may then send the communication over distribution system 108 to recipients 114. For example, media generator 102 may mail the financial gift card with a personal greeting card to a recipient 114 via U.S. Mail on the recipient's birthday. Alternatively or additionally, system 100 may prepare a communication to distribute the financial gift card over network 110 to recipients 114. In either case, system 100 may send the communication itself and/or may arrange a third party (e.g., a department store or bank) to send the communication to the recipient.

System 100 may also, prior to delivery of the gift card, notify recipient 114 that a customer 112 has scheduled a gift card delivery for recipient 114. Server 104 may inform the recipient that he/she may redeem the gift card at a predetermined location (e.g., website, department store, bank, etc.). For example, server 104 may transmit over the Internet to the recipient, an e-mail indicating that the recipient has just received a gift card courtesy of one of customers 112.

In exemplary embodiments, system 100 may monitor the status of the distributed gift card (stage 208). For instance, system 100 may distribute gift cards that may be converted into a credit card offered by the financial institution offering the gift card. To this end, the gift card may be in the form of a pre-approved credit card having a certain credit or pre-paid balance. System 100 would thus, as part of distributing the gift card, obtain credit information on recipient 114 based on information received from customer 112, to determine the type of credit card for pre-approval for recipient 114. When recipient 114 receives the gift card, media generator 102 may include a notification that recipient 114 may use the gift credit card until the pre-paid balance is exhausted. For instance, system 100 would clear any purchase transactions made using the gift credit card until recipient 114 has exceeded the pre-paid balance. System 100 may then monitor the use of the card by recipient 114 to determine when the pre-paid balance is exceeded.

When system 100 determines that recipient 114 has or is about to exceed the pre-paid balance, media generator 102 may send a notification to recipient 114 that such an event has or is about to take place. Further, the notification may state that recipient 114 may continue using the gift card as a credit card upon recipient 114 agreeing to activate such functionality of the card. For instance, recipient 114 may be required to access server 104 to activate the gift card's use as a credit card. In such a case, system 100 would then clear purchase transactions made by recipient above the pre-paid balance so long as those purchase transactions do not exceed any credit limit associated with the gift credit card account. In further alternative embodiments, system 100 may also automatically convert the gift credit card to a credit card account once recipient 114 has exhausted the pre-paid balance. Media generator 102 may then send a notification to recipient 114 that the gift card has changed status to a credit card account.

Once system 100 has converted the gift card to a credit card account, system 100 may then treat recipient 114 as a standard credit card account customer. Therefore, system 100 may allow a financial institution to increase its market base by allowing customers 112 to purchase gift cards that may be converted into standard credit cards by recipients 114 once received by recipients 114. In this manner, the financial institution may increase its customer base for credit card or other types of accounts.

Figure 3:
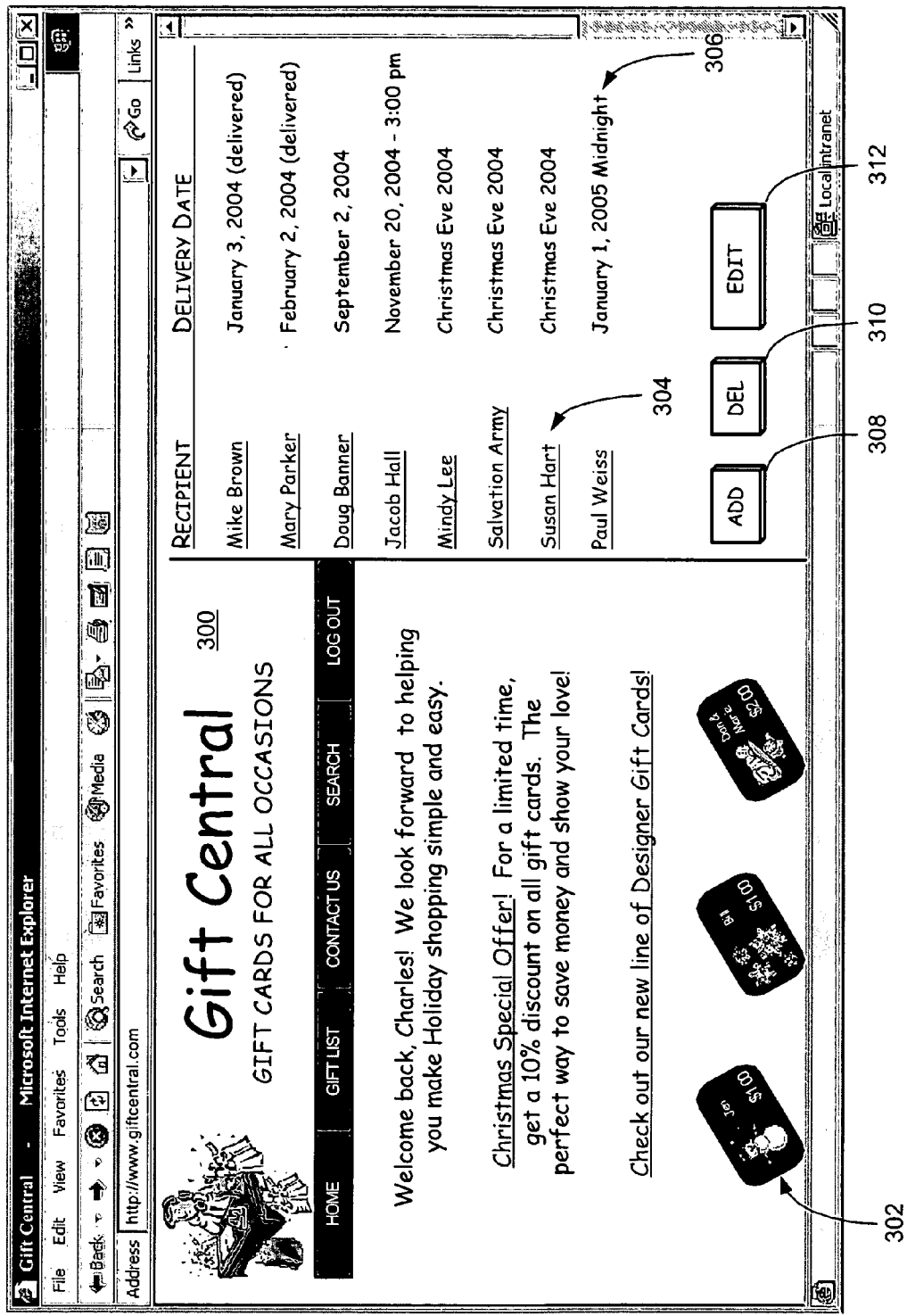
FIG. 3 illustrates an exemplary website for providing a gift card consistent with the invention.

FIG. 3 illustrates an exemplary web page 300, consistent with the invention, through which customers 112 or recipients 114 may access server 104. Customers 112 and recipients 114 may use web page 300 to access server 104 to perform or implement the functions described above with respect to FIGS. 1 and 2.

For example, FIG. 3 illustrates that through web page 300, server 104 may allow a customer 112 to select financial gift cards (illustrated by icon 302) for delivery to various recipients 114, such as the customer's friends, relatives, or other associates. Exemplary web page 300 illustrates such identified gift card recipients at data field 304. Web page 300 also illustrates a data field 306 identifying specified dates and times at which system 100 is to distribute the selected gift cards, as well as the status of any such delivered gift card. Exemplary web page 300 further illustrates features, such as selectable ADD button 308, for a customer 112 to order new gift cards for delivery and to thus provide the gift distribution information described above with respect to stage 202 of FIG. 2 via other data entry fields not shown. Web page 300 may also include a selectable DELETE button 310 for customer 112 to delete a previously purchased gift card, as well as a selectable EDIT button 312 to modify previously entered gift distribution information. The exemplary web page 300 of FIG. 3 is simply for illustrative purposes, and other types of web pages, if any, may be used by system 100 to implement the methods consistent with the present invention.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method, performed by a processor, for providing a financial card to at least one recipient for a consumer, the method comprising:
   receiving financial card distribution information from a consumer, wherein the financial card distribution information identifies at least one recipient for a financial card and a predetermined delivery time for providing the financial card to the recipient;
   storing the financial card distribution information in a database, such that the stored financial card distribution information is associated with the consumer;
   preparing a communication to the recipient to provide the financial card to the recipient at the predetermined delivery time;
   converting an account associated with the delivered financial card into a credit card account; and
   pre-approving the recipient for the credit card account based on the financial card distribution information received from the consumer.

2. The method of claim 1, wherein receiving the financial card distribution information further comprises:
   receiving information identifying a financial card selected by the consumer.

3. The method of claim 1, wherein the selected financial card is a gift card.

4. The method of claim 1, wherein the selected financial card is a pre-stored value card.

5. The method of claim 4, wherein the pre-stored value card is associated with a monetary amount, and wherein receiving the financial card distribution information comprises:
   receiving from the consumer the monetary amount to be included on the pre-stored value card provided to the recipient.

6. The method of claim 1, further comprising:
   providing the consumer with date selection criteria for allowing the consumer to identify the predetermined delivery time, wherein the consumer may identify multiple delivery times respectively associated with multiple financial cards.

7. The method of claim 1, wherein the consumer is a financial account customer of a financial institution, and wherein the method further comprises:
   charging the consumer's financial account for the financial card provided to the recipient.

8. The method of claim 7, wherein the consumer's financial account is charged at the predetermined delivery time.

9. The method of claim 1, wherein the financial card distribution information includes information about the recipient, and wherein preparing the communication to the recipient comprises:
   preparing the communication according to information about the recipient.

10. The method of claim 9, wherein the communication to the recipient includes personal information about the recipient received from the consumer.

11. The method of claim 1, further comprising:
    providing the consumer with date selection criteria for allowing the consumer to schedule the predetermined delivery time, wherein the consumer may schedule multiple delivery times respectively associated with multiple financial cards for automatic delivery at the scheduled multiple delivery times.

12. A system for providing a financial card to at least one recipient for a consumer, the system comprising:
    a component for receiving financial card distribution information from a consumer, wherein the financial card distribution information identifies at least one recipient for a financial card and a predetermined delivery time for providing the financial card to the recipient;
    a component for storing the financial card distribution information in a database, such that the stored financial card distribution information is associated with the consumer;
    a component for preparing a communication to the recipient to provide the financial card to the recipient at the predetermined delivery time;
    a component for converting an account associated with the delivered financial card into a credit card account; and a component for pre-approving the recipient for the credit card account based on the financial card distribution information received from the consumer.

13. The system of claim 12, wherein the component for receiving the financial card distribution information further comprises:

a component for receiving information identifying a financial card selected by the consumer.

14. The system of claim 12, wherein the selected financial card is a gift card.

15. The system of claim 12, wherein the selected financial card is a pre-stored value card.

16. The system of claim 15, wherein the pre-stored value card is associated with a monetary amount, and wherein the component for receiving the financial card distribution information comprises:

a component receiving from the consumer the monetary amount to be included on the pre-stored value card provided to the recipient.

17. The system of claim 12, further comprising:

a component for providing the consumer with date selection criteria for allowing the consumer to identify the predetermined delivery time, wherein the consumer may identify multiple delivery times respectively associated with multiple financial cards.

18. The system of claim 12, wherein the consumer is a financial account customer of a financial institution, and wherein the system further comprises:

a component for charging the consumer's financial account for the financial card provided to the recipient.

19. The system of claim 18, wherein the consumer's financial account is charged at the predetermined delivery time.

20. The system of claim 12, wherein the financial card distribution information includes information about the recipient, and wherein the component for preparing the communication to the recipient comprises:

a component for preparing the communication according to information about the recipient.

21. The system of claim 20, wherein the communication to the recipient includes personal information about the recipient received from the consumer.

22. The system of claim 12, further comprising:

a component for providing the consumer with date selection criteria for allowing the consumer to schedule the predetermined delivery time, wherein the consumer may schedule multiple delivery times respectively associated with multiple financial cards for automatic delivery at the scheduled multiple delivery times.

23. A computer-readable medium which stores a set of instructions which when executed performs a method for providing a financial card to at least one recipient for a consumer, the method comprising:

receiving financial card distribution information from a consumer, wherein the financial card distribution information identifies at least one recipient for a financial card and a predetermined delivery time for providing the financial card to the recipient;

storing the financial card distribution information in a database, such that the stored financial card distribution information is associated with the consumer;

preparing a communication to the recipient to provide the financial card to the recipient at the predetermined delivery time;

converting an account associated with the delivered financial card into a credit card account; and pre-approving the recipient for the credit card account based on the financial card distribution information received from the consumer.

24. The computer-readable medium of claim 23, wherein receiving the financial card distribution information further comprises:

receiving information identifying a financial card selected by the consumer.

25. The computer-readable medium of claim 23, wherein the selected financial card is a gift card.

26. The computer-readable medium of claim 23, wherein the selected financial card is a pre-stored value card.

27. The computer-readable medium of claim 26, wherein the pre-stored value card is associated with a monetary amount, and wherein receiving the financial card distribution information comprises:

receiving from the consumer the monetary amount to be included on the pre-stored value card provided to the recipient.

28. The computer-readable medium of claim 23, wherein the method further comprises:

providing the consumer with date selection criteria for allowing the consumer to identify the predetermined delivery time, wherein the consumer may identify multiple delivery times respectively associated with multiple financial cards.

29. The computer-readable medium of claim 23, wherein the consumer is a financial account customer of a financial institution, and wherein the method further comprises:

charging the consumer's financial account for the financial card provided to the recipient.

30. The computer-readable medium of claim 29, wherein the consumer's financial account is charged at the predetermined delivery time.

31. The computer-readable medium of claim 23, wherein the financial card distribution information includes information about the recipient, and wherein preparing the communication to the recipient comprises:

preparing the communication according to information about the recipient.

32. The computer-readable medium of claim 31, wherein the communication to the recipient includes personal information about the recipient received from the consumer.

33. The computer-readable medium of claim 23, wherein the method further comprises:

providing the consumer with date selection criteria for allowing the consumer to schedule the predetermined delivery time, wherein the consumer may schedule multiple delivery times respectively associated with multiple financial cards for automatic delivery at the scheduled multiple delivery times.

* * * * *